(12) United States Patent
Goemmel et al.

(10) Patent No.: US 8,009,410 B2
(45) Date of Patent: Aug. 30, 2011

(54) MODULAR KEYFOB WITH PIVOTING ARMATURES

(75) Inventors: Frank Goemmel, Sonnefeld (DE); John Burca, Fairview, PA (US)

(73) Assignee: Lear Corporation GmbH, Ginsheim-Gustavsberg (DE)

( * ) Notice: Subject to any disclaimer, the term of this patent is extended or adjusted under 35 U.S.C. 154(b) by 182 days.

(21) Appl. No.: 12/401,042

(22) Filed: Mar. 10, 2009

(65) Prior Publication Data
US 2009/0244824 A1 Oct. 1, 2009

(30) Foreign Application Priority Data
Mar. 28, 2008 (DE) .......................... 10 2008 016 201

(51) Int. Cl.
*H05K 5/00* (2006.01)
*H05K 7/00* (2006.01)
*E05B 19/04* (2006.01)
*E05B 19/08* (2006.01)

(52) U.S. Cl. ...................... 361/679.01; 340/5.72; 70/399

(58) Field of Classification Search ............. 361/679.01; 70/256, 257, 395, 403, 399; 174/560, 564; 340/5.72
See application file for complete search history.

(56) References Cited

U.S. PATENT DOCUMENTS

| | | | |
|---|---|---|---|
| 4,888,970 A | 12/1989 | Kinzler et al. | |
| 4,941,569 A | 7/1990 | Lindmayer et al. | |
| 5,541,571 A | 7/1996 | Ochs et al. | |
| 5,943,889 A | 8/1999 | Chiu | |
| D434,302 S | 11/2000 | Van Den Acker | |
| 6,216,501 B1 | 4/2001 | Marquardt et al. | |
| D442,466 S | 5/2001 | Van Den Acker | |
| 6,276,179 B1 * | 8/2001 | Janssen et al. ................. | 70/395 |
| 6,367,298 B1 * | 4/2002 | Janssen et al. ................. | 70/395 |
| 6,427,504 B1 * | 8/2002 | Janssen et al. ................. | 70/395 |
| 6,499,326 B1 | 12/2002 | Heussner | |
| 6,647,752 B1 | 11/2003 | Chaillic | |
| 6,691,539 B2 | 2/2004 | Jacob et al. | |
| 6,705,141 B1 | 3/2004 | Jacob et al. | |
| 6,713,895 B1 | 3/2004 | Krapfl | |
| 6,892,558 B2 | 5/2005 | Chodosh | |
| 7,055,352 B2 | 6/2006 | Meyerson et al. | |
| 7,127,922 B2 | 10/2006 | Khounsombath et al. | |

(Continued)

FOREIGN PATENT DOCUMENTS

| | | |
|---|---|---|
| DE | 19952247 C1 | 4/2001 |
| EP | 1321608 A1 | 6/2003 |

OTHER PUBLICATIONS

German Office Action for corresponding Application No. 10 2008 016 201.9, mailed Mar. 11, 2009, 4 pages.

*Primary Examiner* — Jinhee J Lee
*Assistant Examiner* — Adrian S Wilson
(74) *Attorney, Agent, or Firm* — Brooks Kushman P.C.

(57) ABSTRACT

In at least one embodiment, a keyfob assembly comprising a housing and a battery chamber is provided. The housing includes a plurality of electrical components positioned therein for transmitting radio frequency (RF) signals to a vehicle. The battery chamber is positioned within the housing and includes at least one removable battery operably coupled to the electrical components for powering the electrical components. The battery chamber is capable of being slideably removed from the housing to facilitate battery exchange.

19 Claims, 8 Drawing Sheets

U.S. PATENT DOCUMENTS

| | | | |
|---|---|---|---|
| 7,166,812 B2 * | 1/2007 | White et al. | 70/395 |
| 7,248,201 B2 * | 7/2007 | Buccinna et al. | 341/22 |
| 7,370,501 B2 | 5/2008 | Miyata et al. | |
| 7,514,642 B2 * | 4/2009 | Burca et al. | 200/302.2 |
| 7,598,462 B2 * | 10/2009 | Burca et al. | 174/564 |
| 2006/0202881 A1 * | 9/2006 | Buccinna et al. | 341/176 |

* cited by examiner

MODULAR KEYFOB WITH PIVOTING ARMATURES

CROSS-REFERENCE TO RELATED APPLICATIONS

This application claims foreign priority benefits under 35 U.S.C. §119(a)-(d) to DE 10 2008 016 201.9, filed Mar. 28, 2008, which is hereby incorporated by reference in its entirety.

BACKGROUND

1. Technical Field

The embodiments of the present invention generally relate to a keyfob for use with a vehicle.

2. Background Art

Keyfobs generally include one or more batteries embedded therein for powering a plurality of electronic circuits within the keyfob. Such circuitry is generally configured to transmit radio frequency (RF) signals to a controller in the vehicle to lock/unlock the doors of the vehicle. Other such operations generally performed by the keyfob include triggering a panic alarm and unlocking liftgates or trunks of a vehicle.

After time, such batteries may lose the capability to power the electronic circuits. As such, a user is required to disassemble a housing of the keyfob to replace the old battery(s) with new battery(s). In some cases, the housing of the keyfob may include a groove for receiving a flat edge tool to pry open the housing to facilitate battery exchange. In some cases, such a prying operation may be difficult to accomplish.

SUMMARY

In at least one embodiment, a keyfob assembly comprising a housing and a battery chamber is provided. The housing includes a plurality of electrical components positioned therein for transmitting radio frequency (RF) signals to a vehicle. The battery chamber is positioned within the housing and includes at least one removable battery operably coupled to the electrical components for powering the electrical components. The battery chamber is capable of being slideably removed from the housing to facilitate battery exchange.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION OF THE EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within any numerical limits stated is generally preferred. Also, unless expressly stated to the contrary, the description of a group or class of materials by suitably or preferred for a given purpose in connection with the invention implies that mixtures of any two or more members of the group or class may be equally suitable or preferred.

Figure 1:
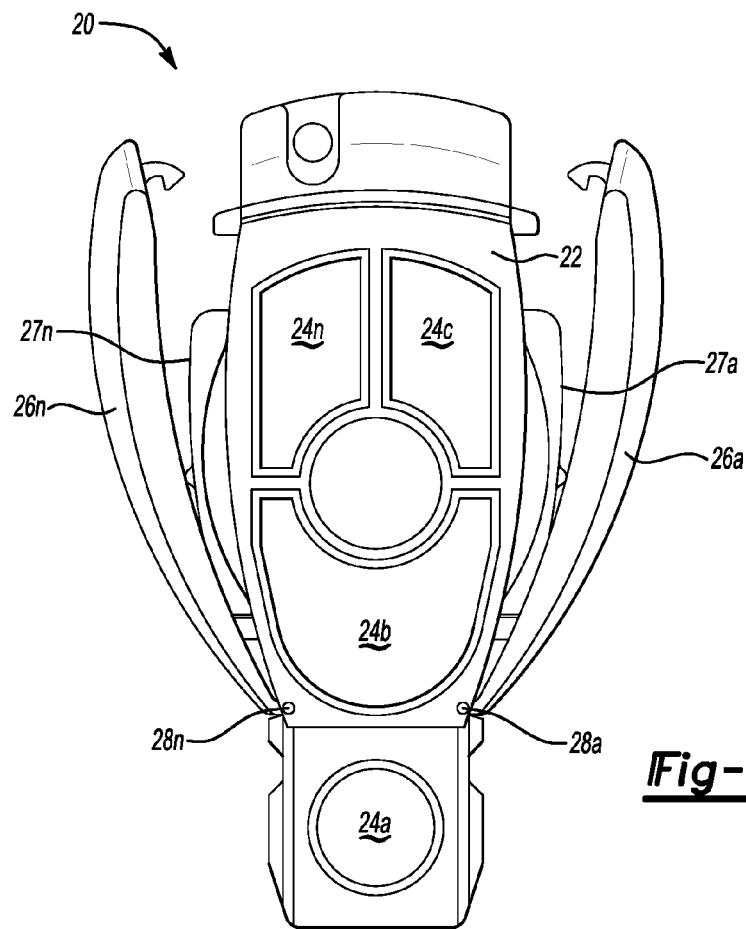
FIG. 1 illustrates a front view of a keyfob assembly in accordance to one embodiment of the present invention.

Referring now to FIG. 1, a front view of a keyfob assembly 20 is shown in accordance to one embodiment of the present invention. The keyfob assembly 20 includes a housing 22 and a plurality of bottons 24a-24n. A plurality of electronics and electrical switches (not shown) are disposed within the housing for coacting with the bottons 24a-24n to generate radio frequency (RF) signals that are indicative of a lock command, an unlock command, a panic alarm command and a liftgate unlock command. The keyfob assembly 20 is generally configured to transmit and such foreseeable operational commands to the vehicle. A controller (not shown) having a receiver therein is positioned in a vehicle and may receive such commands and perform the lock, unlock, panic, or other such suitable operations in response to the RF signals transmitted by the keyfob assembly 20.

The keyfob assembly 20 further includes one or more armatures 26a-26n that are adapted for pivotal movement to and from the housing 22. One or more hinges 28a-28n are positioned within the housing 22 for defining a pivot axis for the armatures 26a-26n, respectively. The armatures 26a-26n are generally adapted to pivot into a locked position with the housing 22 and an unlocked position away from the housing 22. When the armatures 26a-26n are in the unlocked position, a user may remove a battery chamber (not shown in FIG. 1) for replacing batteries as needed. First and second leaf springs 27a and 27n are coupled to the housing 22. The leaf springs 27a and 27n assist the armatures 26a and 26n in pivoting away from the housing 22. In one example, the leaf springs 27a-27n may be integrated with the housing 22.

Figure 2:
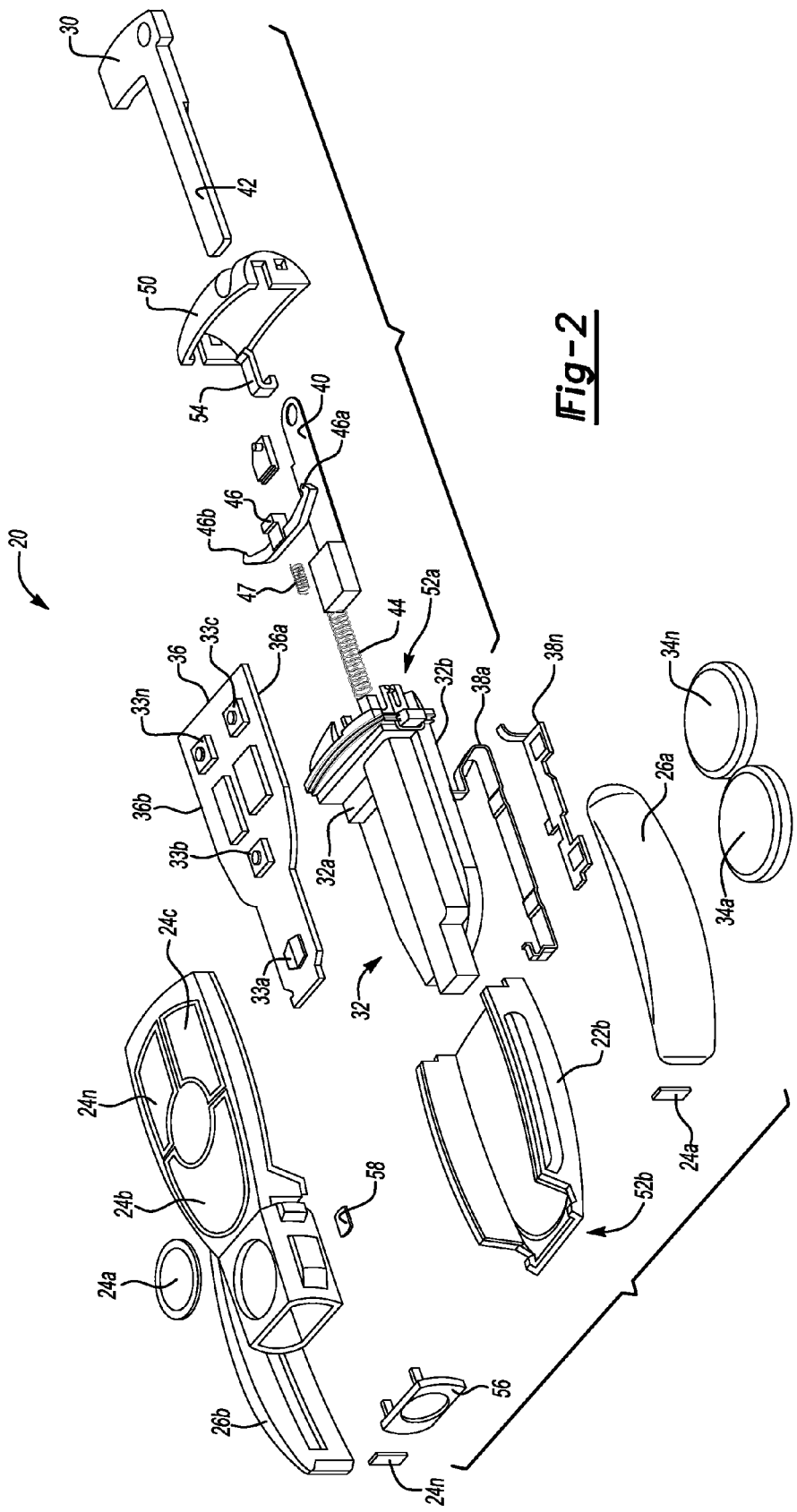
FIG. 2 illustrates an exploded view of the keyfob assembly of FIG. 1.

Referring now to FIG. 2, an exploded view of the keyfob assembly 20 is shown. The housing 22 includes an upper housing 22a and a lower housing 22b. The upper housing 22a is coupled to the lower housing 22b. The upper housing 22a may be welded or glued to the lower housing 22b. A battery chamber 32 having first and second sides 32a, 32b is positioned within the housing 22. The battery chamber 32 is generally configured to receive and retain one or more batteries 34a-34n at the second side 32b.

The keyfob assembly 20 includes a circuit board 36. One or more electrical switches 33a-33n are mounted on the circuit board 36. The circuit board 36 includes first and second sides 36a and 36b. The circuit board 36 is generally positioned on (or supported by) the first side 32a of the battery chamber 32. The second side 36b of the circuit board 36 generally faces an underside of the upper housing 22a such that the bottons 24a-24n contact the electrical switches 33a-33n to generate RF signals in response to a user depressing the buttons 24a-24n. Additional circuitry (not shown) may be positioned on the circuit board 36 for coacting with the switches 33a-33n to generate the RF signals.

One or more battery contact plates 38a-38n are integrated within the battery chamber 32 to facilitate voltage transfer between the batteries 34a-34n positioned on the second side 32b of the battery chamber 32 to the electronics positioned on the circuit board 36. The battery chamber 32 includes a key holder 40 for receiving a mechanical key 30. The key holder 40 includes a holster 42 for retaining an end 42 of the mechanical key 30. A first spring 44 is positioned (in a cavity internal to the battery chamber 32) between the holster 42 and a wall (not shown) of the battery chamber 32 to facilitate retractable movement of the mechanical key out of the battery chamber 32. A clip 46 having locking ends 46a-46b is positioned within the battery chamber 32 for locking/unlocking the armatures 26a-26n to/from the housing 22. A second spring 47 is positioned (in a cavity internal to the battery chamber 32) between the clip 46 and a wall (not shown) of the battery chamber 32 to facilitate retractable motion for engaging and disengaging the armatures 26a-26n.

An end member 50 is positioned over a first end 52 of the housing 22 for enclosing the battery chamber 32. The end member 50 may include a one or more openings (or cavities) (not shown) to facilitate the insertion and the removal of the key 30 to and from the battery chamber 32. A first key locking member 48 is positioned on the end member 50 for locking the key 30 to the battery chamber 22. The end member 50 also includes a second key locking member 54 for locking the key 30 to the housing 22. A first light reflector 56 is coupled to a second end 52b of the housing for projecting infrared light signals. A second light reflector 58 is coupled to the housing 22 for providing battery charge status in response to a user depressing one or more of the bottoms 24a-24n.

Figure 3:
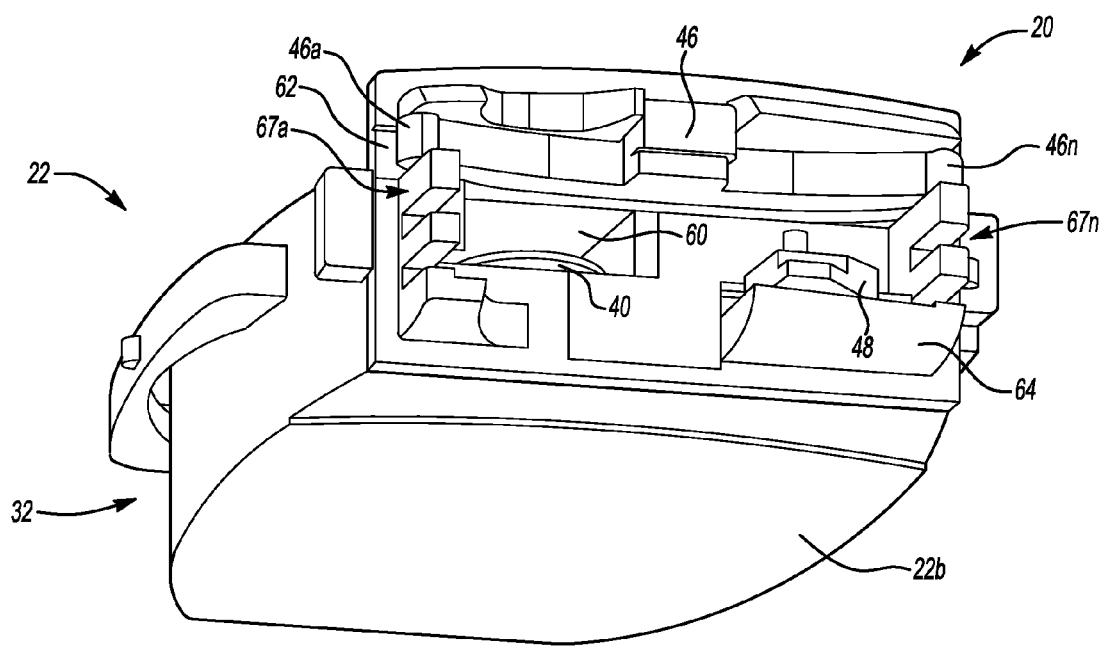
FIG. 3 illustrates a perspective view of one end of a battery chamber of the keyfob assembly.

Referring now to FIG. 3, a perspective view of one end of the battery chamber 32 is shown. The battery chamber 32 includes a first opening 60 for receiving the key holder 40 and the first spring 44. While not shown in FIG. 3, the mechanical key 30 is generally inserted into the first opening 60 and received by the key holder 40. The battery chamber 32 includes a second opening 62 for receiving the clip 46 and the second spring 47. In one embodiment, the battery chamber 32 may include a projection member 64 positioned thereon for facilitating slideable movement of the first key locking member 48. In general, the first key locking member 48 is generally adapted to engage portions of the mechanical key 30 and linearly slide in a transverse manner across the battery chamber 32 in response to the key 30 being inserted to and retracted from the battery chamber 32. Such an operation will be discussed in more detail in connection with FIGS. 4a-4b. The first key locking member 48 includes a pin 72 for engaging the mechanical key 30. The battery chamber 32 includes a plurality of locking members 67a-67b for locking the end member 50 (not shown in FIG. 3) to the battery chamber 32 and to the housing 22.

Figure 4A:
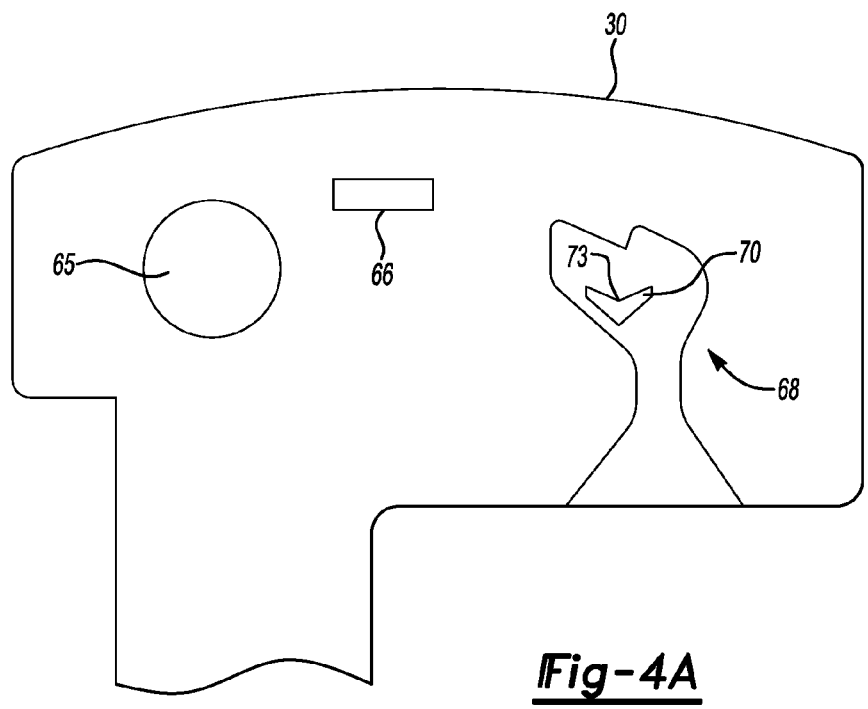
FIG. 4a illustrates a front view of a mechanical key of the keyfob assembly.

Referring now to FIG. 4a, a front view of the mechanical key 30 is shown. The mechanical key 30 includes a notch 65 such that the mechanical key 30 is capable of being fastened to a vertical surface via retaining mechanism (e.g., a nail, screw, etc. or capable of having a key ring inserted therethrough. In general, the mechanical key 30 is removable from the battery chamber 32.

The mechanical key 30 further includes at least one recess 66 positioned thereon. Such a recess 66 is generally configured to receive the second key locking member 54 for locking the key 30 to the housing 22. The mechanical key 30 further includes a channel section 68 for receiving the first key locking member 48. The channel section 68 includes a channel projection 70 such that the channel projection 70 and the channel section 68 coact with a pin 72 positioned on the first key locking member 48 to facilitate the insertion and removal of the key 30 to and from the battery chamber 32. The channel projection 70 defines a groove 73 for cooperating with the pin 72 to facilitate the insertion and removal of the key 30. Such a feature will be discussed in more detail in connection with FIG. 4b. As shown, the channel section 68 may be shaped in the form of a fish tail and the channel projection 70 may be generally U-shaped or V-shaped. In general, the channel section 68 of the keyfob assembly 20 may take on any number of configurations. The size and shape of the channel section 68 as well as the particular position of the channel projection 70, and the particular shape of the channel projection 70 in the channel section 68 may be varied to meet the desired criteria of a particular application.

Figure 4B:
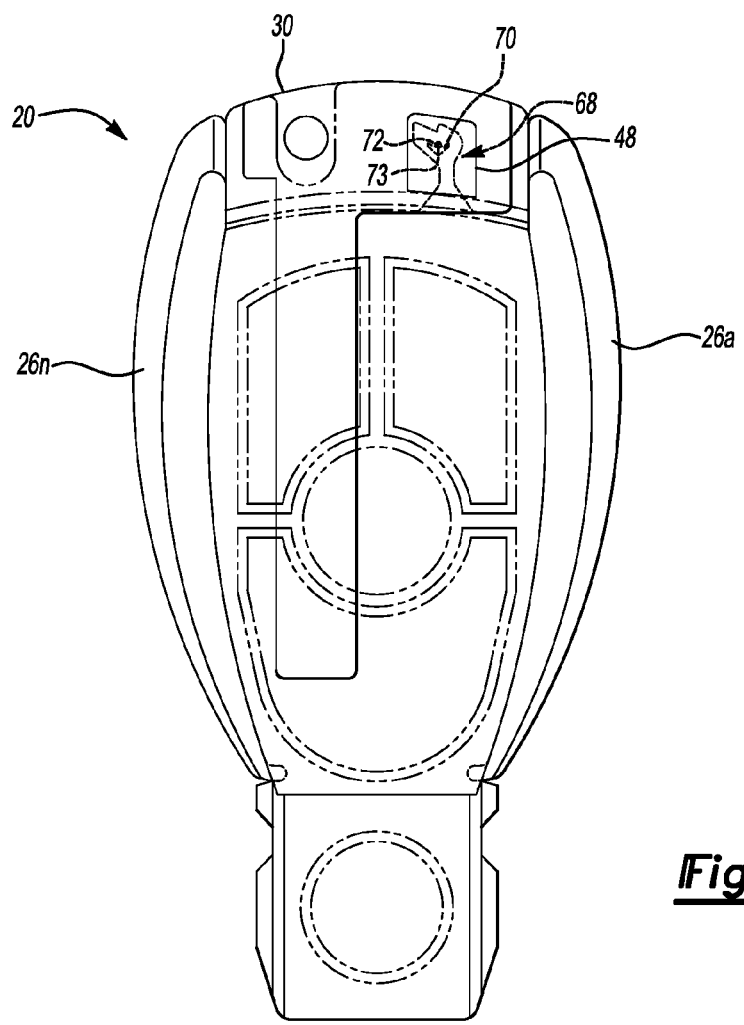
FIG. 4b illustrates a front view of the mechanical key positioned within the battery chamber.

Referring now to FIG. 4b, another front view of the mechanical key 30 is shown. FIG. 4b illustrates the mechanical key 30 positioned within the housing 22. The second key locking member 54 is shown coupled to the recess 66. To disengage the key 30 from the battery chamber 32, the user disengages the second key locking member 54 from the recess 66 of the key 30. In response to disengaging the second key locking mechanism 54 from the recess 66, the user pushes against the key 30 such that key 30 and the key holder 40 applies a force to compress the first spring 44 against a wall (not shown, positioned within the first opening 60) of the battery chamber 32. The first spring 44 compresses into a compressed state and then rebounds thereby applying a force against the key holder 40 such that the key holder 40 retracts away from the battery chamber 32. The key holder 40 is generally configured such that the key holder 40 remains engaged to the battery chamber 32. A retaining device (not shown) may be coupled to the key holder 40 and engaged to a cavity positioned within the battery chamber 32 to prevent the key holder 40 from being removed from the battery chamber 32.

The pin 72 of the first key locking member 48 is disposed in a groove 73 of the channel projection 70. As the key 30 is fully seated within the battery chamber 32, the pin 72 is engaged to the groove 73. When the first spring 44 is being compressed (as described above), the first key locking member 48 slides inboard of the keyfob assembly 20 thereby allowing the pin 72 to move out of engagement with the groove 73 while remaining within the channel section 68. As the first spring 44 decompresses or rebounds the key 30 is pushed away from the battery chamber 32 thereby allowing the channel section 68 to move past the pin 72. As the key 30 continues to move out of the battery chamber 32, the pin 72 disengages from the channel section 68 thereby releasing the key 30 from the first key locking member 48. As noted above, the key holder 40 remains engaged to the battery chamber 32 during the retraction operation.

To insert the key 30 back into the housing 22, the user inserts the end 42 of the key 30 into the first opening 60 of the battery chamber 32 (and into the key holder 40) and continues to slide the key 30. As the user continues to slide the key 30 into the first opening 60, the pin 72 enters into the channel section 68 and comes into contact with a lower portion of the channel projection 70. As noted above, the channel projection 70 may be U-shaped or V-shaped, as such, the pin 72 contacts the lower portion of the channel projection 70 that is opposite to the groove 73 of the projection 70. The pin 72 travels outboard of the channel projection 70 (e.g. due to the slideable movement of the first key locking member 48) after contacting the lower portion of the channel projection 70. As the key 30 continues to be inserted into the first opening 60, the pin 72 travels within the channel section 68 in a counter-clockwise direction such that channel section 68 directs the pin 72 toward the groove 73 of the channel projection 70. Once the key 30 is fully inserted into the battery chamber 32, the pin 72 engages the groove 73. The user may actuate the second key locking member 54 so that the second key locking member 54 engages the recess 66 of the key 30 to lock the key 30 in place (e.g., to lock the key 30 to the battery chamber 32). The keyfob assembly 20 contemplates that the channel section 68 may be implemented such that the channel section 68 is mirrored from the implementation as shown in FIG. 4a. In such a case, the operation for inserting and retracting the key 30 to and from the battery chamber 32 is opposite to that described above.

Figure 5:
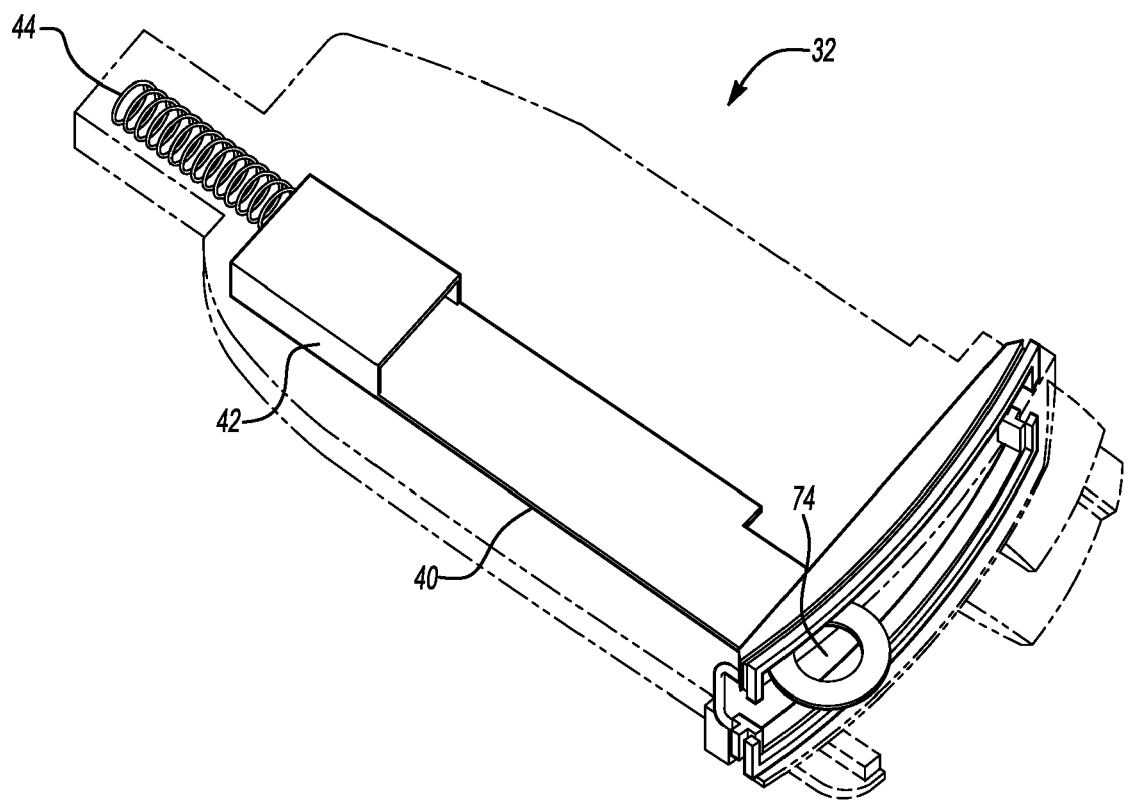
FIG. 5 illustrates a perspective view of the battery chamber in including a keybox positioned therein.

Referring now to FIG. 5, a perspective view of the key holder 40 of the keyfob assembly 20 is shown. As shown, the key holder 40 resides within the first opening 60 of the battery chamber 32. As noted above, the first spring 44 is positioned against a wall of the battery chamber 32 and the key holder 40. The first spring 44 may be coupled to an end of the key holder 40. In such an example, channels (not shown) may be formed at the end of the key holder 40 for receiving and coupling the first spring 44. A second notch 74 may be formed within the key holder 40 so that the key holder 40 may be coupled along with the mechanical key 30 to any vertical surface.

Figure 6A:
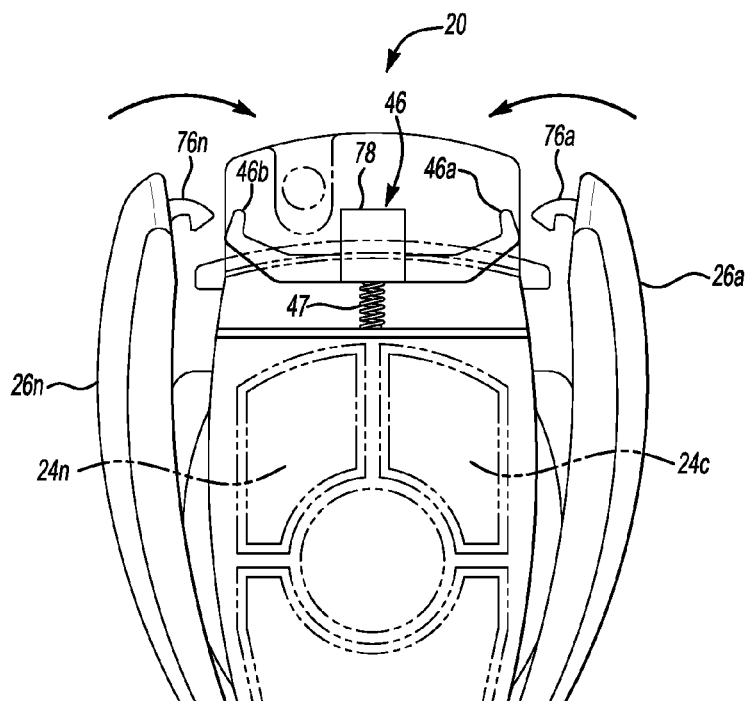
FIG. 6a illustrates a first front view of a pair of armatures of the keyfob assembly.
Figure 6B:
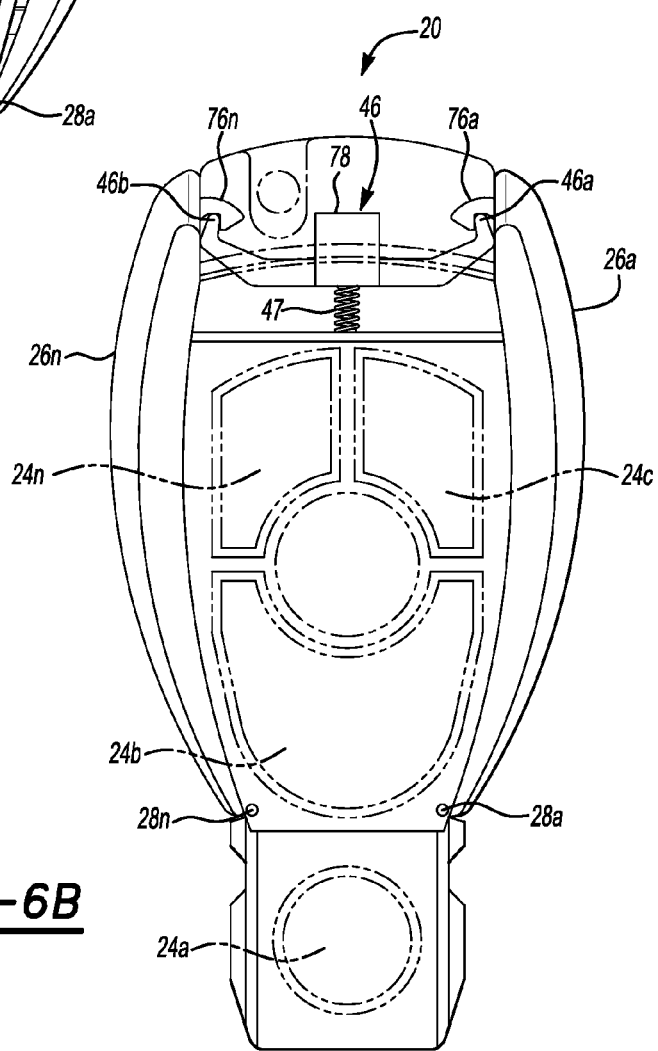
FIG. 6b illustrates a second front view of the armatures of the keyfob assembly.

Referring now to FIGS. 6a-6b, first and second front views of the armatures 26a-26n are shown in the locked position and in the unlocked position, respectively. Each armature 26a and 26n includes an engagement member 76a and 76n, respectively. As shown, the engagement members 76a and 76n are engaged with the locking ends of the 46a and 46n for locking the armatures 26a-26n to the housing 22. In the event a user is required to replace the batteries 34a-34n of the keyfob assembly 20, it is generally necessary to place the armatures 26a-26n in the unlocked position. Prior to placing the armatures 26a-26n in the unlocked position, the user may remove the mechanical key 30 as per the operation noted in connection with FIG. 4b. The clip 46 includes a dislodging member 78 which is generally accessible to the user once the mechanical key 30 is removed.

The user may use the end 42 of the key 30 to contact the dislodging member 78 such that the clip 46 applies a force against the second spring 47 thereby compressing the second spring 47. In response to the second spring 47 being compressed, the engagement members 76a and 76n disengage from the locking ends 46a and 46n, respectively, for unlocking the armatures 26a and 26n from the housing 22. The armatures 26a and 26n pivot about the hinges 28a and 28n, respectively. The battery chamber 32 is generally configured for slideable movement to and from the housing 22 once the armatures 26a and 26n are pivoted away from the housing 22. For example, as the user removes the battery chamber 32 from the housing 22 (e.g. when the armatures 26a-26n are disengaged from the clip 46), the user may simply grab the end member 50 since the end member 50 is coupled to battery chamber 32. The user may fold the armatures 26a and 26n toward the housing 22 to lock the engagement members 76a and 76n to the locking ends 46a and 46n, respectively.

Figure 6C:
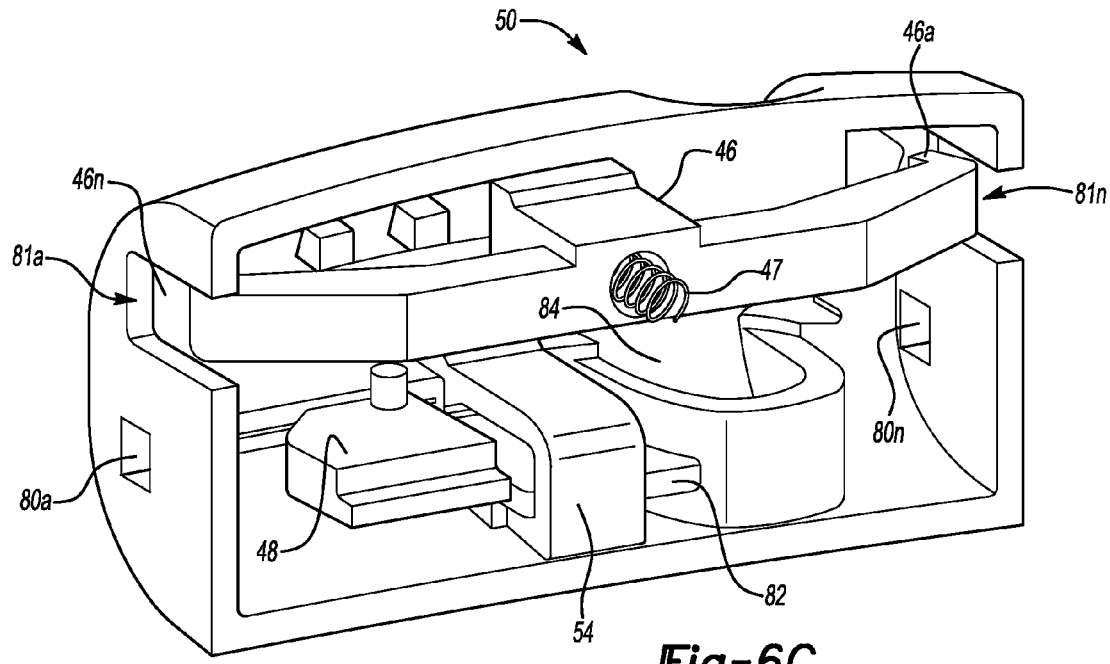
FIG. 6c illustrates a perspective view of an end member of the keyfob assembly.

Referring now to FIG. 6c, a perspective view of the end member 50 of the keyfob assembly 20 is shown. The end member 50 includes receiving recesses 80a and 80n for receiving the locking members 67a and 67n, respectively, to couple the end member 50 to the battery chamber 32 (see FIG. 3 for locking members 67a and 67n). The end member 50 includes engagement recesses 81a-81n for allowing the engagement members 76a-76n of the clip 46 to pass therethrough. The end member 50 holds the clip 46 and the second spring 47 into engagement with the battery chamber 32.

The end member 50 includes a support mechanism 82 for mounting the second key locking member 54 thereon. The support mechanism 82 may also be adapted to mount the first key locking member 48 thereon as an alternate embodiment to mounting the first key locking member 48 to the battery chamber 32. The support mechanism 82 may facilitate slideable movement of the first key locking member 48 in the inboard and the outboard directions. The end member 50 defines a recess 84 to allow the user to grasp the key 30.

Figure 7:
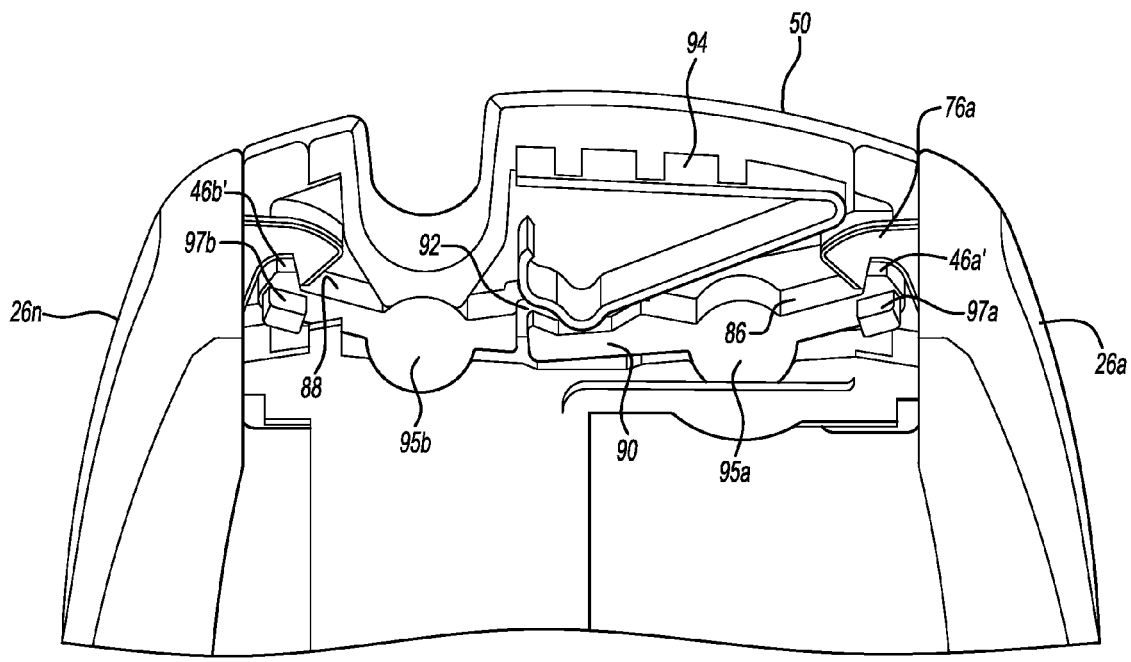
FIG. 7 illustrates a perspective view of an alternate embodiment of a retaining member.

Referring now to FIG. 7, an alternate embodiment a clip 46' is shown. The clip 46' includes first and second clip sections 86 and 88. Each clip section 86 and 88 includes a spring receiving section 90 and 92, respectively. One end of a spring 94 is generally positioned against the spring receiving sections 90 and 92. The spring receiving sections 90 and 92 are generally positioned proximate to each other. The width of the spring 94 may be arranged such that there is substantial overlap of the spring 94 across each spring receiving sections 90 and 92. A section of the spring 94 is generally engaged to an under section of the end cap 50 for applying a predetermined force against the spring 94 to retain the spring 94 within the keyfob assembly 20. Each clip section 86 and 88 includes locking ends 46a' and 46b' to engage the engagement members 76a and 76n of the armatures 26a and 26n, respectively. Each clip section 86 and 88 includes a dislodging member 97a and 97b, respectively.

To disengage the locking ends 46a' and 46b' from the engagement members 76a and 76n, a user may use the key 30 to apply a force against each dislodging member 97a and 97b. The key 30 is generally removed in order for the user to have access to the dislodging members 97a-97b. While exerting a downward force on the dislodging member 97a, the locking end 46a' is pushed downward thereby releasing the engagement member 76a of the armature 26a. In response to exerting a downward force on the dislodging member 97a, the base 95a and the spring receiving section 90 pivot about the battery chamber 32 thereby applying an upward force against the spring 94 which causes the spring 94 to compress a predetermined amount.

In a similar manner, while exerting a downward force on the dislodging member 97b, the locking end 46b' is pushed downward thereby releasing the engagement member 76n of the armature 26n. In response to exerting a downward force on the dislodging member 97b, the base 95b and the spring receiving section 92 pivot about the battery chamber 32 thereby applying an upward force against the spring 94 which causes the spring 94 to compress a predetermined amount.

Figure 8A:
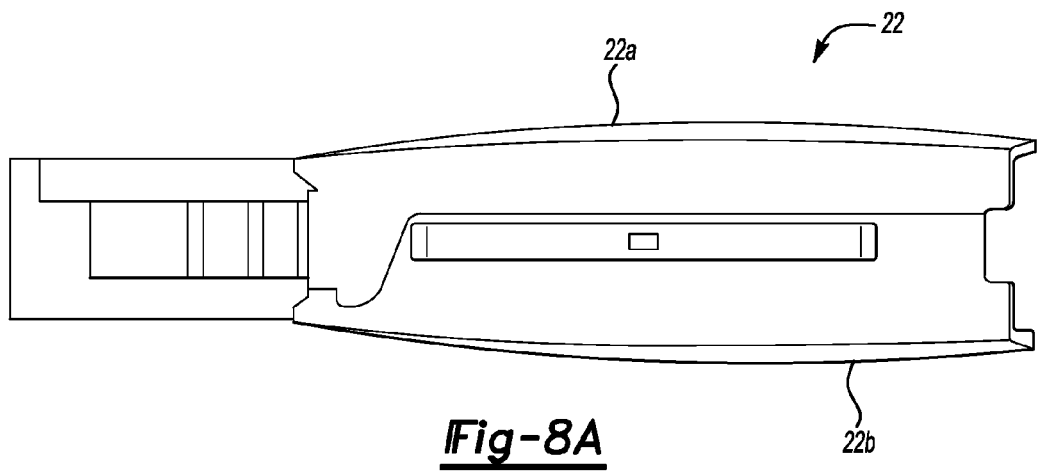
FIG. 8a illustrate a side view of a keyfob housing.
Figure 8B:
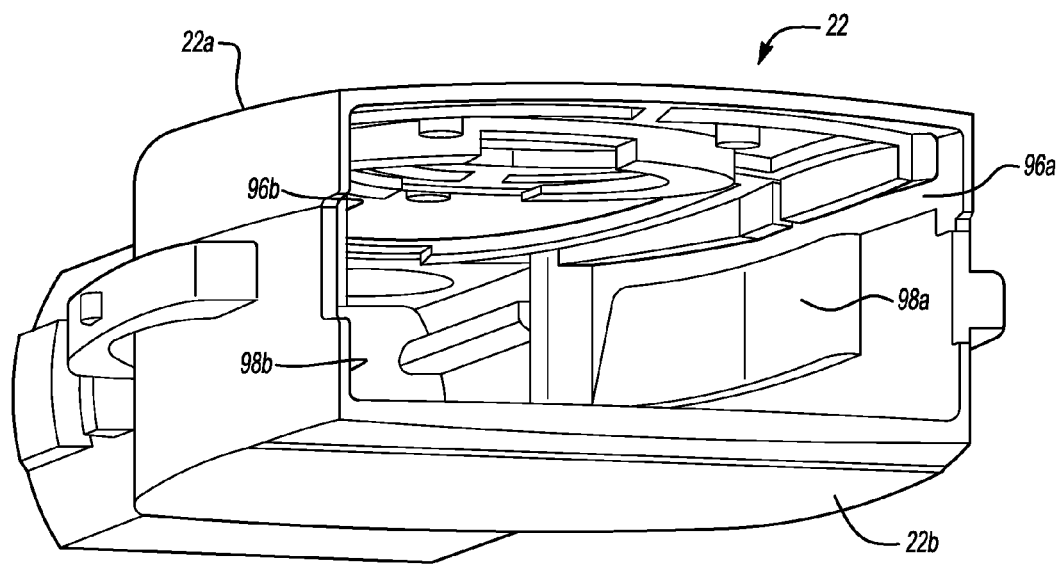
FIG. 8b illustrate a perspective view of the keyfob housing.

Referring now to FIGS. 8a-8b, a side and perspective view of the housing 22 are shown, respectively. FIG. 8a illustrates that the upper and the lower housing 22a and 22b, respectively may be separate pieces coupled together to define the housing 22. In one embodiment, the upper housing 22a an and the lower housing 22b may be coupled together via adhesive or other such retaining mechanism. In another embodiment, the upper housing 22a and the lower housing 22b may be coupled together via a groove and tongue configuration or other such interlocking characteristic generally situated to mate a female part to a male part.

In reference to FIG. 8b, a pair of circuit board channels 96a and 96b are formed within the housing 22 for receiving the circuit board 36. A pair of slide surfaces 98a and 98b are positioned interior to the housing 22 for slideably receiving the battery chamber 32. The slide surfaces 98a and 98b generally protrude from interior walls of the housing 22.

Figure 9A:
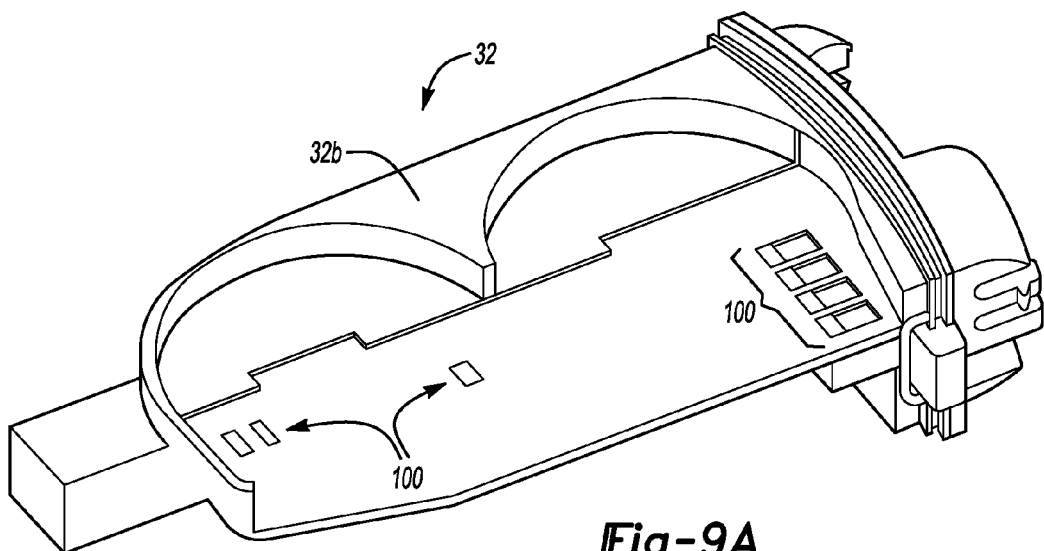
FIG. 9a illustrate a perspective view of a first side of the battery chamber.
Figure 9B:
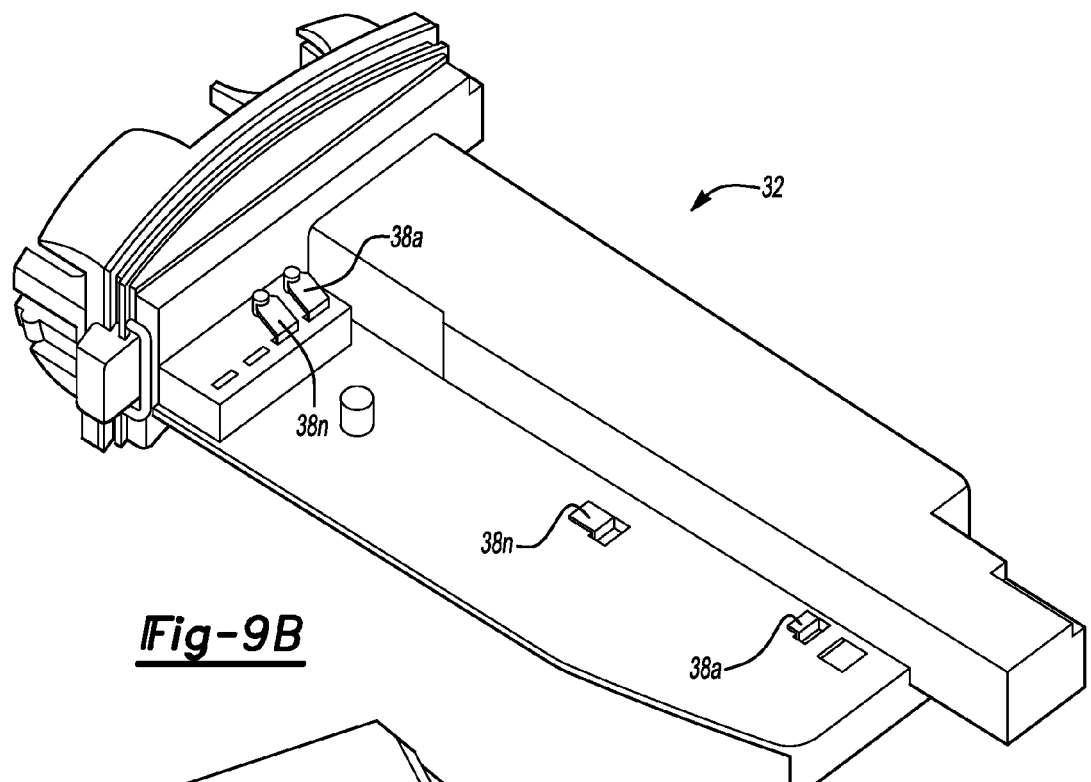
FIG. 9b illustrate a perspective view of a second side of the battery chamber.

Referring now to FIGS. 9a-9b, the first and the second side 32a and 32b of the battery chamber 32 is shown. As illustrated, the second side 32b of the battery chamber 32 is generally configured to receive and store one or more batteries 34a-34n. The battery chamber 32 defines a plurality of through holes 100 therein. The through holes 100 extend internally within the battery chamber 32 from one end to another end. The battery contact plates 38a-38n are inserted into the through holes 100 for transferring electrical energy from the battery to electrical components on the circuit board 36. In one example, the battery contact plates 38a-38n may be insert molded into the battery chamber 32.

Figure 10:
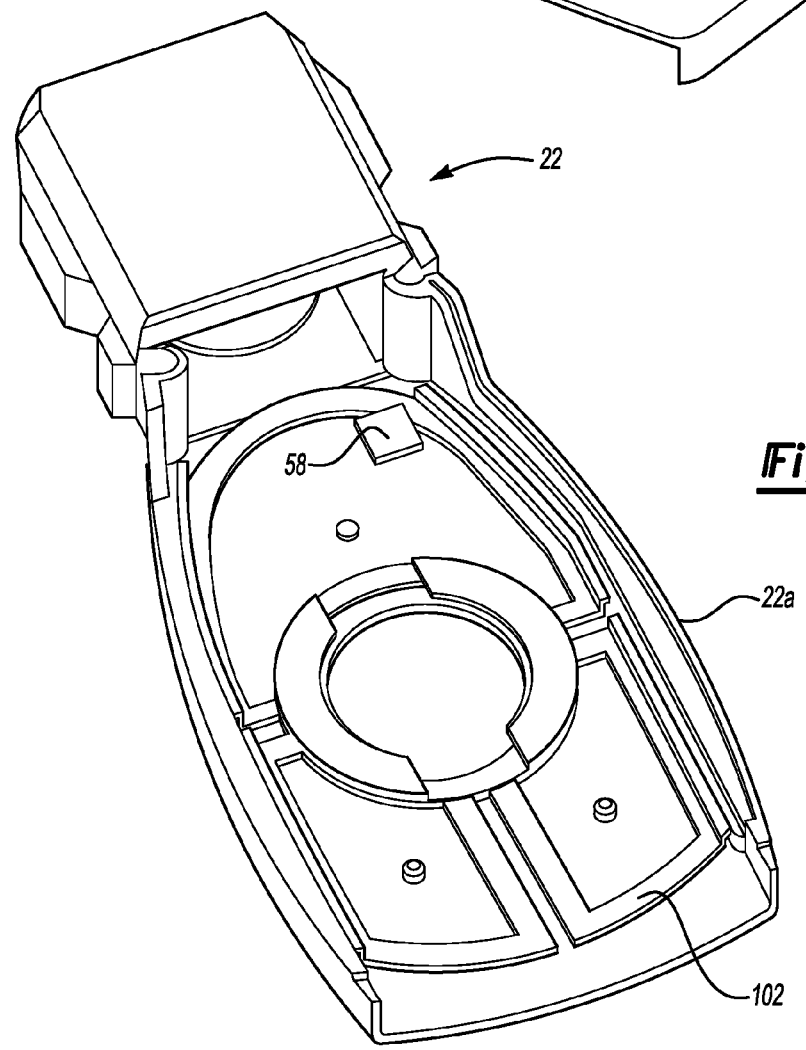
FIG. 10 illustrates a perspective view of one side of the keyfob housing.

Referring now to FIG. 10, a perspective view of the upper housing 22a is shown. The upper housing 22a is generally configured to receive an insert 102 for providing an meshing interface between the buttons 24a-24n located on the exterior of the keyfob assembly 20 and the electrical switches 33a-33n mounted on the circuit board 36 for tactile purposes. In one example, the insert 102 may be constructed of polyamide. In another example, the insert 102 may be a two component molding that comprises hard and soft plastic. The soft plastic component may be constructed of thermal plastic elasture (TPE). The second light reflector 58 is positioned on an interior section of the upper housing 22a and configured to provide battery charge status to the user in response to a bottom 24a-24n being toggled.

ELEMENT LIST

20 Keyfob Assembly
22 Housing
22a Upper Housing
22b Lower Housing
24a-24n Buttons
26a-26n Armatures
27a-27n Leaf Springs
28a-28n Hinges
30 Mechanical Key
32 Battery Chamber
32a First Side of Battery Chamber
32b Second Side of Battery Chamber
33a-33n Electrical Switches
34a-34n Batteries
36 Circuit Board
36a First Side of Circuit Board
36b Second Side of Circuit Board
38a-38n Battery Contact Plates
40 Key Holder
42 End of Key
44 First Spring
46 Clip
46a-46b Locking Ends
47 Second Spring
48 First Key Locking Member
50 End Member
52a First End of the Housing
54 Second Key Locking Member
56 First Light Reflector
58 Second Light Reflector
60 First Opening of the Battery Chamber
62 Second Opening of the Battery Chamber
64 Projection Member
65 First Notch (key ring role)
66 Recess
67a-67n Locking Members
68 Channel Section
70 Channel Projection
72 Pin
74 Second Notch
76a-76n Engagement Members
78 Dislodging Member
80a-80n Receiving Recesses
82 Support Mechanism
84 Recess
46' Clip
86 First Clip Section
88 Second Clip Section
90 First Spring Receiving Section
92 Second Spring Receiving Section
95a-95b First and Second Bases
96a-96b Circuit Board Channels
97a-97b Dislodging Members
98a-98b Slide Surfaces
100 Through Holes
102 Insert While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A keyfob assembly comprising:
    a housing including a plurality of electrical components positioned therein for transmitting a radio frequency (RF) signal to a vehicle;
    a mechanical key positioned within the housing;
    a battery chamber removably positioned within the housing and including at least one removable battery operably coupled to the plurality of electrical components for powering the plurality of electrical components; and
    at least one armature coupled to the housing for pivotal movement to and from the housing to lock and unlock the battery chamber to and from the housing to facilitate battery exchange.

2. The keyfob assembly of claim 1 wherein the at least one armature is configured to prevent the battery chamber from being removed from the housing when the at least one armature is locked to the housing and to facilitate the slideable removal of the battery chamber from the housing when the at least one armature is unlocked from the housing.

3. The keyfob assembly of claim 1 further comprising a clip positioned within the housing for locking and unlocking the at least one armature to the housing.

4. The keyfob assembly of claim 3 further comprising a spring coupled to the clip, wherein the clip includes at least one dislodging member and wherein the at least one dislodging member and the spring cooperate with each other to unlock the clip from the at least one armature.

5. The keyfob assembly of claim 1 wherein the mechanical key is positioned within an opening of the battery chamber for slideable movement to and from the battery chamber.

6. The keyfob assembly of claim 5 further comprising at least one key locking member positioned about the mechanical key to lock and unlock the mechanical key to and from the battery chamber.

7. The keyfob assembly of claim 6 wherein the mechanical key includes at least one of a recess and a channel section including a channel projection, wherein the at least one of the recess and the channel section cooperate with the at least one key locking member to facilitate slideable movement of the mechanical key to and from the battery chamber.

8. The keyfob assembly of claim 6 further comprising a key holder and a spring coupled to an end of the key holder such that the spring, the key holder, the channel section, and the channel projection of the mechanical key cooperate with each other to retract the mechanical key from the opening of the battery chamber.

9. The keyfob assembly of claim 1 further comprising at least one leaf spring coupled to the housing to facilitate pivotal movement of the at least one armature from the housing.

10. A keyfob assembly comprising:
 a housing including at least one electrical component positioned therein for transmitting a wireless signal to a vehicle;
 a battery chamber positioned within the housing and including at least one removable battery operably coupled to the at least one electrical component for powering the at least one electrical component, wherein the battery chamber is configured for slideable removal from the housing to facilitate battery exchange;
 at least one armature coupled to the housing for pivotal movement to and from the housing to lock and unlock the battery chamber to and from the housing; and
 a mechanical key positioned within an opening of the battery chamber for slideable movement to and from the battery chamber.

11. The keyfob assembly of claim 10 wherein the at least one armature is configured to prevent the battery chamber from being removed from the housing when the at least one armature is locked to the housing and to facilitate the slideable removal of the battery chamber from the housing when the at least one armature is unlocked from the housing.

12. The keyfob assembly of claim 10 further comprising a clip positioned within the housing for locking and unlocking the at least one armature to and from the housing.

13. The keyfob assembly of claim 12 further comprising a spring coupled to the clip, wherein the clip includes at least one dislodging member and wherein the at least one dislodging member and the spring cooperate with each other to unlock the clip from the at least one armature.

14. The keyfob assembly of claim 10 further comprising at least one key locking member positioned about the mechanical key to lock and unlock the mechanical key to and from the battery chamber.

15. The keyfob assembly of claim 14 wherein the mechanical key includes at least one of a recess and a channel section including a channel projection, wherein the at least one of the recess and the channel section cooperate with the at least one key locking member to facilitate slideable movement of the mechanical key to and from the battery chamber.

16. The keyfob assembly of claim 15 further comprising a key holder and a spring coupled to an end of the key holder such that the spring, the key holder, the channel section, and the channel projection of the mechanical key cooperate with each other to retract the mechanical key from the opening of the battery chamber.

17. The keyfob assembly of claim 10 further comprising at least one leaf spring coupled to the housing to facilitate pivotal movement of at least one armature from the housing.

18. A keyfob assembly comprising:
 a housing including at least one electrical component positioned therein for transmitting a wireless signal to a vehicle;
 a mechanical key positioned within the housing;
 a battery chamber removably positioned within the housing and including at least one removable battery for powering the at least one electrical component; and
 at least one armature coupled to the housing for pivotal movement to and from the keyfob assembly to lock and unlock the battery chamber to and from the housing.

19. The keyfob assembly of claim 18 wherein the battery chamber is configured to slideably move to and from the housing.

* * * * *